(12) United States Patent
Hughes et al.

(10) Patent No.: US 9,250,914 B2
(45) Date of Patent: Feb. 2, 2016

(54) METHOD AND APPARATUS FOR SELECTING CACHE LOCALITY FOR ATOMIC OPERATIONS

(71) Applicant: Intel Corporation, Santa Clara, CA (US)

(72) Inventors: Christopher J. Hughes, Santa Clara, CA (US); Daehyun Kim, San Jose, CA (US); Camilo A. Moreno, Sunnyvale, CA (US); Jong Soo Park, Santa Clara, CA (US); Richard M. Yoo, Stanford, CA (US)

(73) Assignee: INTEL CORPORATION, Santa Clara, CA (US)

( * ) Notice: Subject to any disclaimer, the term of this patent is extended or adjusted under 35 U.S.C. 154(b) by 231 days.

(21) Appl. No.: 14/137,218

(22) Filed: Dec. 20, 2013

(65) Prior Publication Data

US 2015/0178086 A1    Jun. 25, 2015

(51) Int. Cl.
| | |
|---|---|
| *G06F 12/00* | (2006.01) |
| *G06F 9/38* | (2006.01) |
| *G06F 15/80* | (2006.01) |
| *G06F 12/08* | (2006.01) |
| *G06F 11/07* | (2006.01) |

(52) U.S. Cl.
CPC .......... *G06F 9/3806* (2013.01); *G06F 12/0897* (2013.01); *G06F 15/80* (2013.01); *G06F 9/3834* (2013.01); *G06F 11/0724* (2013.01); *G06F 12/0806* (2013.01); *G06F 12/0811* (2013.01); *G06F 12/0842* (2013.01)

(58) Field of Classification Search
CPC . G06F 12/0842; G06F 12/0806; G06F 15/80; G06F 12/0897; G06F 12/0811; G06F 9/3834; G06F 9/3045; G06F 11/0724
USPC ......................................................... 711/125
See application file for complete search history.

(56) References Cited

U.S. PATENT DOCUMENTS

| | | | | | |
|---|---|---|---|---|---|
| 5,802,054 | A | * | 9/1998 | Bellenger | H04L 45/745 370/401 |
| 5,835,742 | A | * | 11/1998 | James | G06F 13/4036 710/112 |
| 6,483,841 | B1 | * | 11/2002 | Chang | H04L 29/06 370/412 |
| 7,460,534 | B1 | * | 12/2008 | Bellenger | H04L 45/745 370/392 |
| 7,631,128 | B1 | * | 12/2009 | Sgrosso | G06F 3/06 709/203 |

(Continued)

OTHER PUBLICATIONS

An out-of-core implementation of the COLUMBUS massively-parallel multireference configuration interaction program; Dachsel et al.; Pacific Northwest National Laboratory.*

*Primary Examiner* — Mardochee Chery
(74) *Attorney, Agent, or Firm* — Nicholson DeVos Webster & Elliott LLP

(57) ABSTRACT

An apparatus and method for determining whether to execute an atomic operation locally or remotely. For example, one embodiment of a processor comprises: a decoder to decode an atomic operation on a local core; prediction logic on the local core to estimate a cost associated with execution of the atomic operation on the local core and a cost associated with execution of the atomic operation on a remote core; and the remote core to execute the atomic operation remotely if the prediction logic determines that the cost for execution on the local core is relatively greater than the cost for execution on the remote core; and the local core to execute the atomic operation locally if the prediction logic determines that the cost for local execution on the local core is relatively less than the cost for execution on the remote core.

21 Claims, 12 Drawing Sheets

(56) References Cited

U.S. PATENT DOCUMENTS

| | | | | |
|---|---|---|---|---|
| 7,979,588 B1* | 7/2011 | Tran | ............ | G06F 13/387 709/203 |
| 7,987,229 B1* | 7/2011 | Kinne | ............ | G06F 13/28 709/200 |
| 8,380,935 B2* | 2/2013 | Abts | ............ | G06F 12/0804 711/144 |
| 8,392,661 B1* | 3/2013 | Metcalf | ............ | G06F 12/10 711/133 |
| 8,645,623 B1* | 2/2014 | O'Shea | ............ | G06F 12/0866 711/100 |
| 2002/0091841 A1* | 7/2002 | Beukema | ............ | G06F 12/145 709/229 |
| 2004/0168032 A1* | 8/2004 | Lee | ............ | G06F 11/1666 711/141 |
| 2012/0197868 A1* | 8/2012 | Fauser | ............ | G06F 17/30286 707/714 |

* cited by examiner

1001

| Instruction Ptr. of Atomic Operation | Last Choice | Number Times Executed | Number of Local Cache Hits | Expected Contention |
|---|---|---|---|---|
| AtomOp#1 IP | Local | 4 | 1 | — |
| AtomOp#2 IP | Remote | — | — | 3 |
| AtomOp#3 IP | Remote | — | — | 1 |
| AtomOp#4 IP | Local | 5 | 4 | — |
| ----- | ----- | ----- | ----- | ----- |

METHOD AND APPARATUS FOR SELECTING CACHE LOCALITY FOR ATOMIC OPERATIONS

BACKGROUND

1. Field of the Invention

This invention relates generally to the field of computer processors. More particularly, the invention relates to an apparatus and method for selecting cache locality for atomic operations.

2. Description of the Related Art

In many instruction set architectures (ISAs), instructions are present to handle so-called "atomic" sequences. In an atomic sequence, an agent executes an operation on data in a manner that ensures that the agent has exclusive ownership of the data until the execution completes. Typically this can be implemented by a locking sequence in which a lock variable is associated with the data such that the agent first obtains exclusive access to the lock variable before accessing the data to be operated on to prevent other agents from accessing the corresponding data during the operation.

Some applications depend heavily on fine-grained atomic updates. The standard way to perform such updates is via a single atomic instruction (e.g., a LOCK-prefixed instruction such as "LOCK ADD"). For certain applications and/or inputs, these atomic updates may be highly contended, i.e., multiple cores may attempt to perform atomic updates on the same memory location simultaneously. The performance and energy efficiency in this situation is quite bad on certain processor architectures: each atomic operation requires a read-for-ownership operation to bring the cache line to a new core's L1 cache, including an invalidation of the cache line in the caches of all other cores. The latency of each atomic update may be significant, especially with larger numbers of cores, and the updates are serialized for contended locations, resulting in additional latency.

A previously-proposed solution to this is "in-memory atomics," where an arithmetic logic unit (ALU) is added to the cache controller or tag directory controller external to the cores, which eliminates data movement from one cache to another, and thus provides better performance and lower energy consumption. However, there are numerous issues (hardware and software) with placing an ALU outside of a core, such as how to handle exceptions.

An alternative is "remote atomics," where a thread requests another core to perform an atomic operation on its behalf. The idea with this implementation is to send the request to a core that is believed to currently hold a cache line identified by the address in question in its cache. This can provide the same benefits as in-memory atomics, with some simplification since existing ALUs may be used.

However, blindly using in-memory atomics and remote atomics at all times may have drawbacks. For example, in non-contended cases, where a line is re-used frequently, current approaches may be more efficient.

BRIEF DESCRIPTION OF THE DRAWINGS

A better understanding of the present invention can be obtained from the following detailed description in conjunction with the following drawings, in which:

FIG. 11 illustrates a table employed in one embodiment of a system for determining whether to execute atomic operations locally or remotely.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
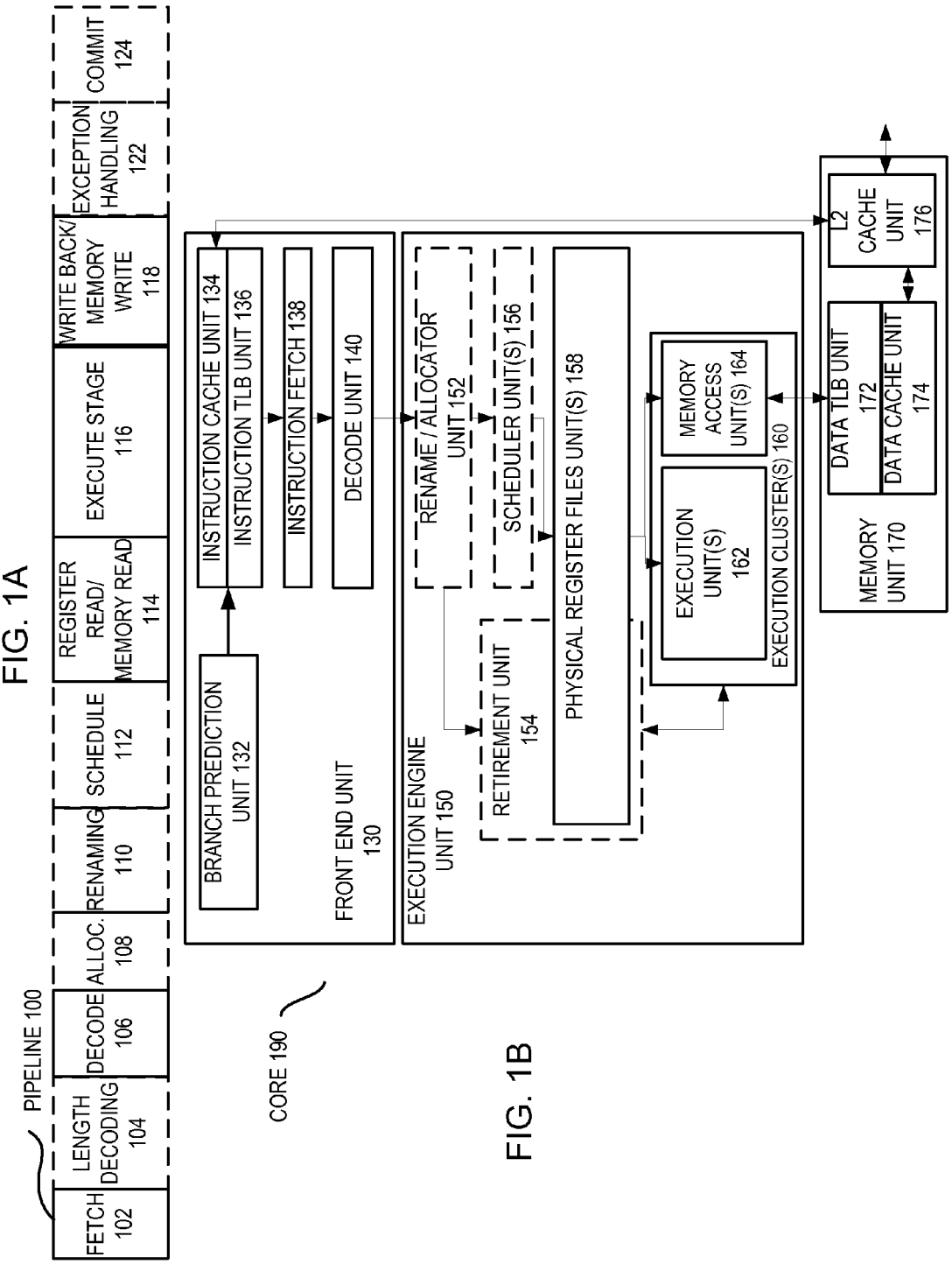
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/ memory read stage 114, an execute stage 116, a write back/ memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/ vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/ memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
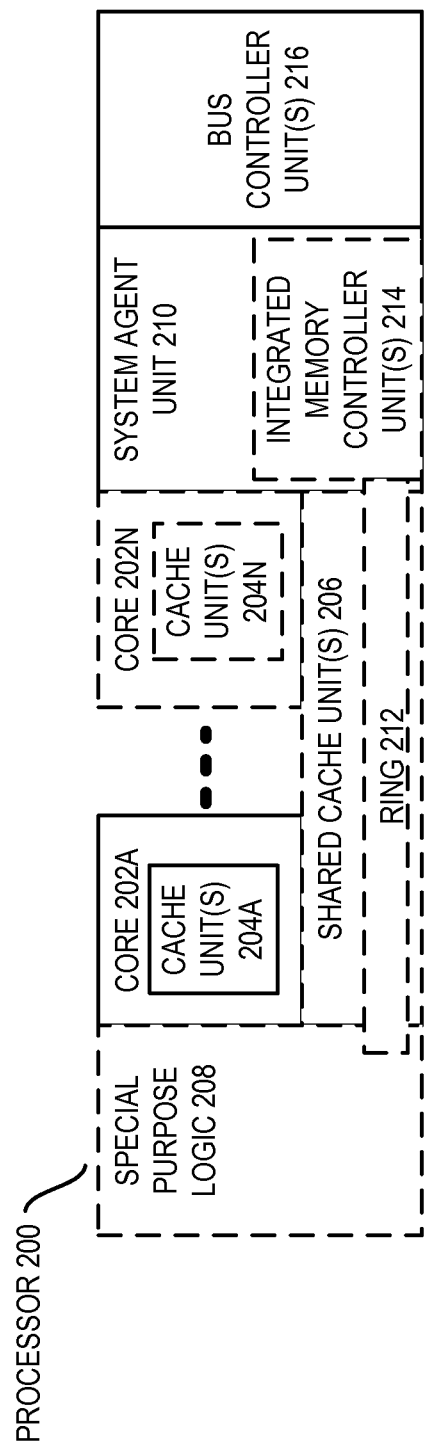
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
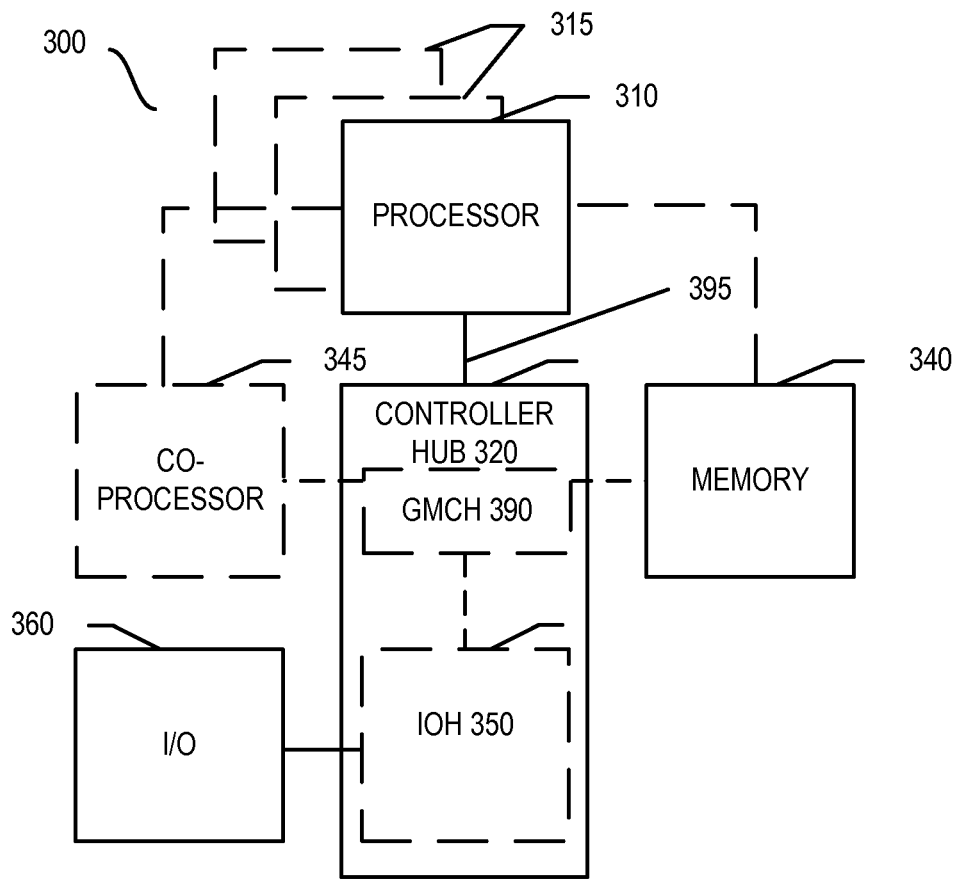
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
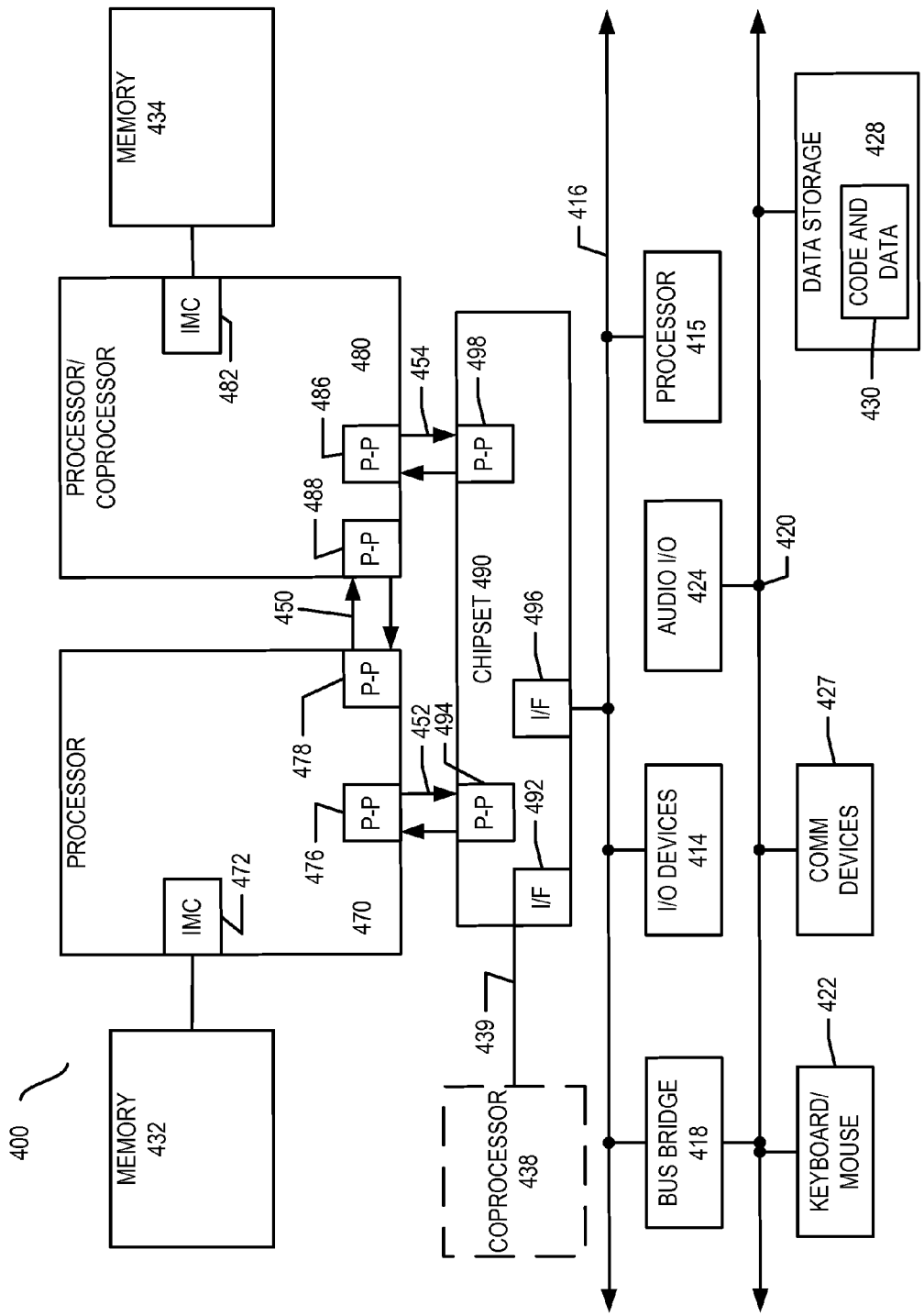
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
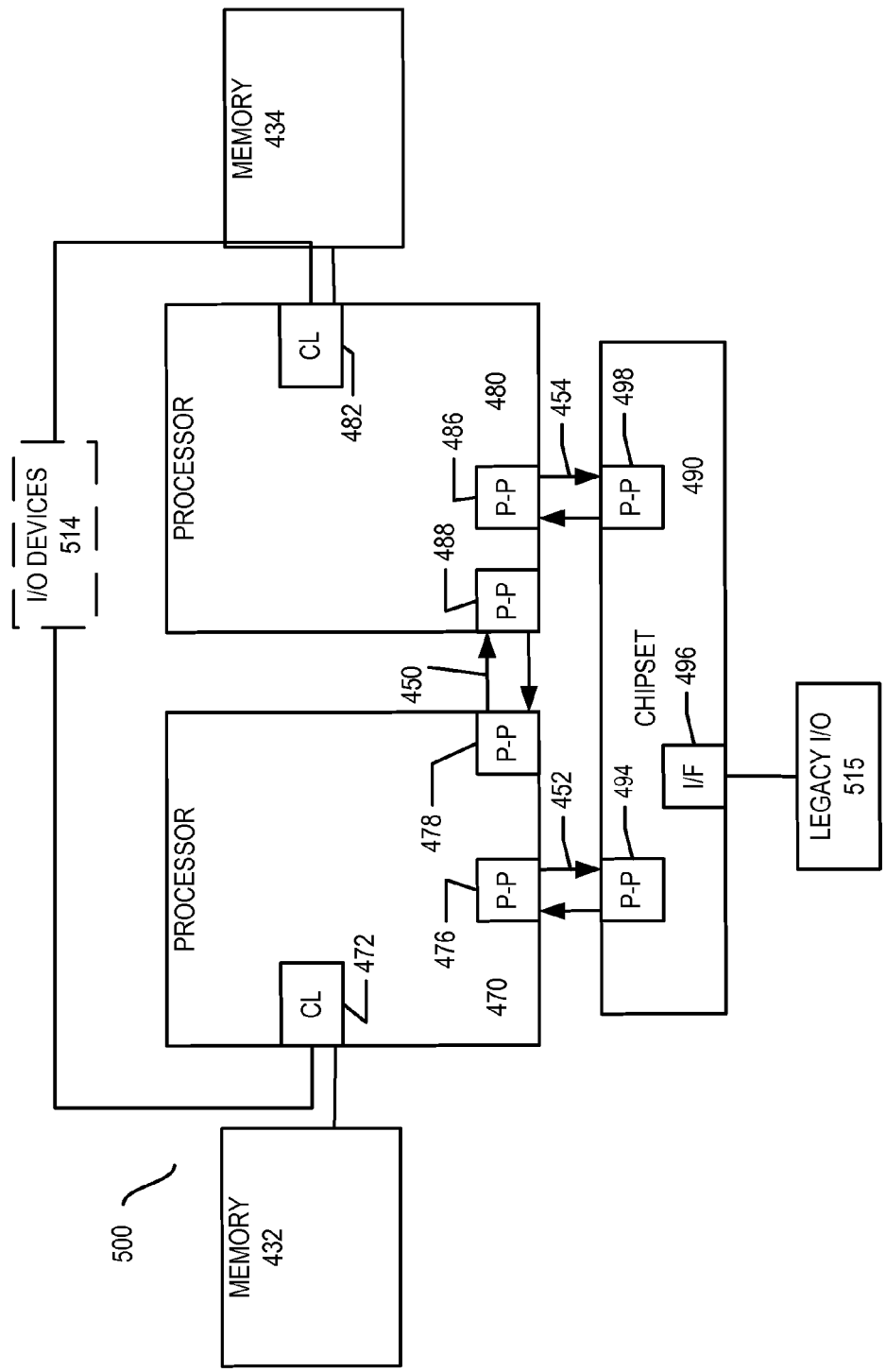
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
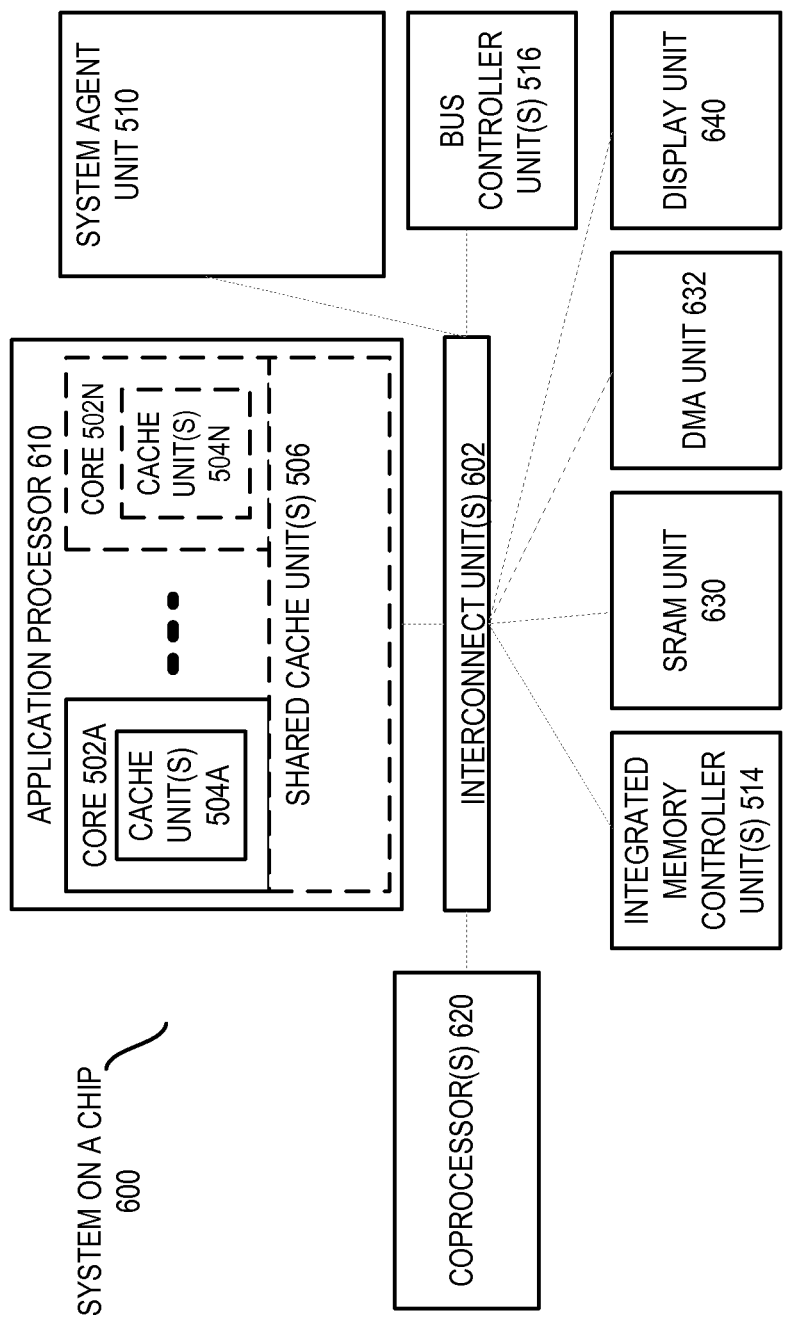
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
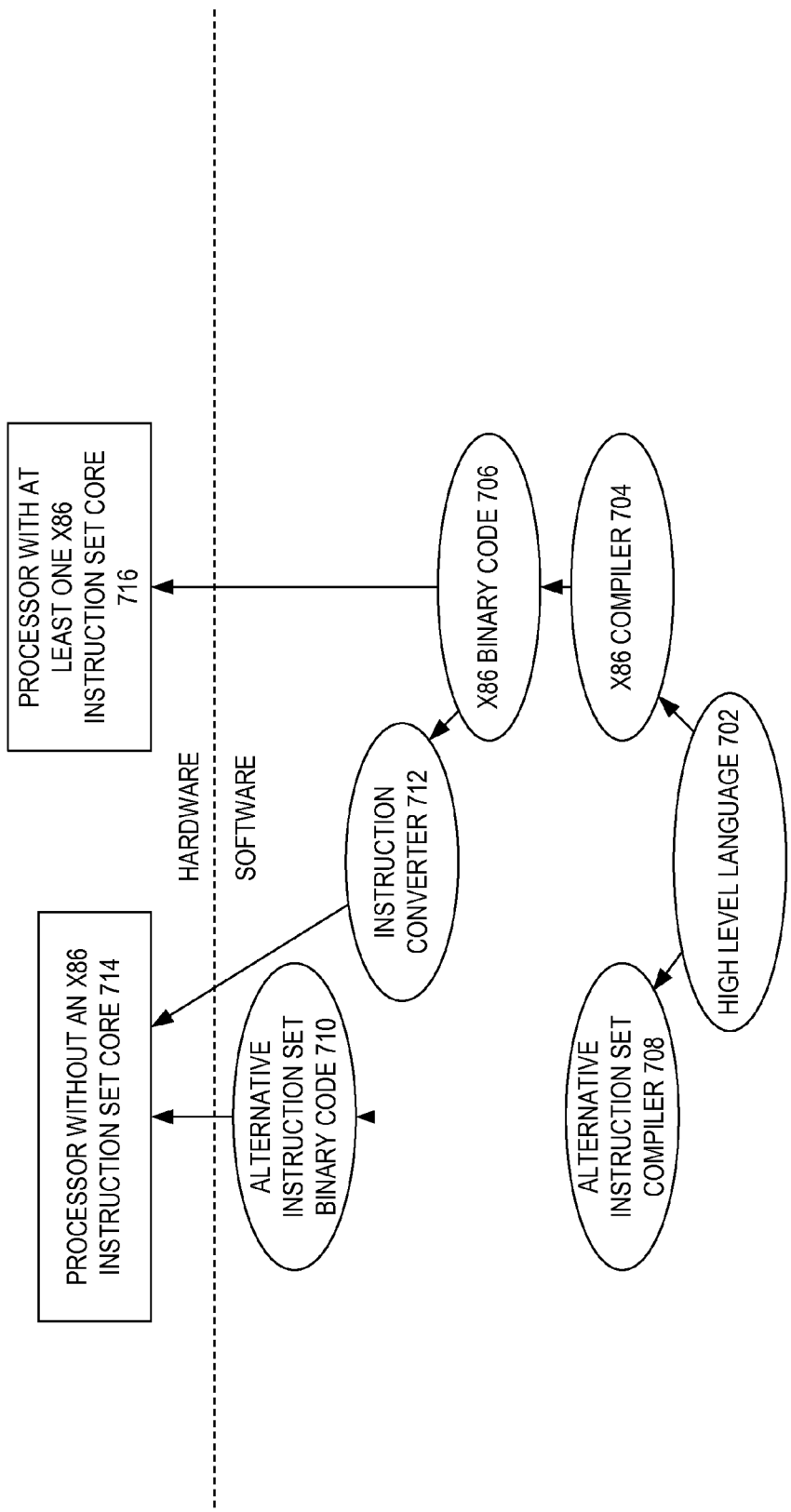
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Selecting Cache Locality for Atomic Operations

One embodiment of the invention includes a predictor that estimates whether it is better to perform a given atomic operation remotely (i.e., on a different core). In one embodiment, determining whether to perform an atomic operation remotely involves predicting whether it is faster and/or cheaper in terms of energy to do so. Several variables come into play, and more accurate (albeit more complicated) predictors may be implemented by factoring in more of these variables. In one embodiment, the variables which are evaluated include (1) the amount of expected contention for the address in question (e.g., the number of cores concurrently requiring the data identified by this address), (2) the amount of expected re-use for that address at the current core (i.e., the frequency with which the current core will use the data), and (3) the amount of information which needs to be sent in a request to perform an atomic operation remotely (e.g., transmitted between cores).

The above variables may be predicted in various ways while still complying with the underlying principles of the invention. In one embodiment discussed in detail below, a prediction table is used to store past history such as number of cache hits and misses associated with each operation.

Figure 8:
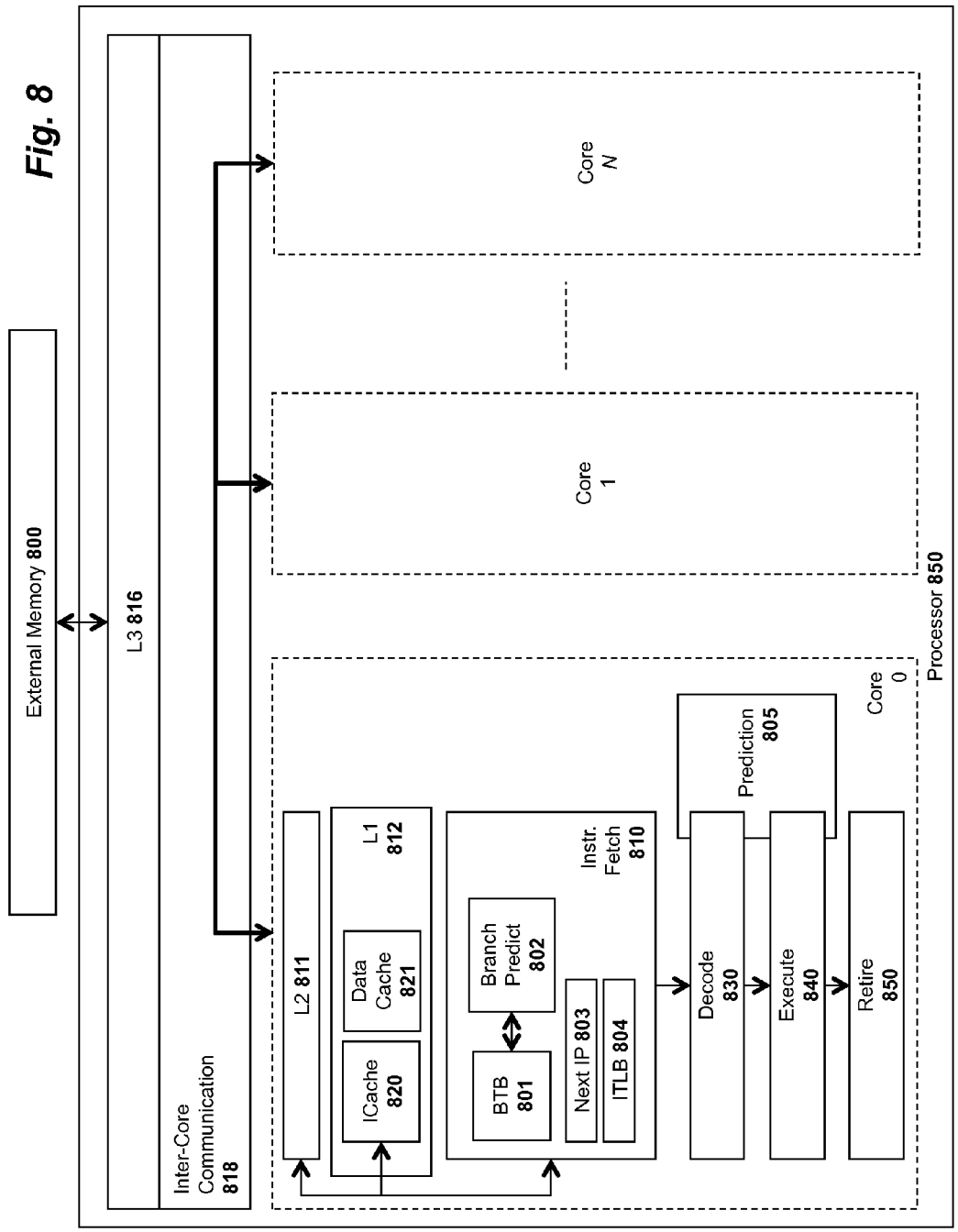
FIG. 8 illustrates one embodiment of a system architecture for determining whether to execute atomic operations locally or remotely.

FIG. 8 illustrates an exemplary processor 850 on which embodiments of the invention may be implemented. The processor 850 includes one or more cores (identified as "Core 0," "Core 1," and Core N in FIG. 8). The details of a single core (Core 0) are illustrated in FIG. 8 for simplicity. It will be understood, however, that each core shown in FIG. 8 may have the same set of logic as Core 0.

As illustrated, the core may have a dedicated Level 1 (L1) cache 812 and Level 2 (L2) cache 811 for caching instructions and data according to a specified cache management policy. The L1 cache includes a separate instruction cache 820 for storing instructions and a separate data cache 821 for storing data. The instructions and data stored within the various processor caches are managed at the granularity of cache lines which may be a fixed size (e.g., 64 or 128 Bytes in length). Each core of this exemplary embodiment has an instruction fetch unit 810 for fetching instructions from main memory 800 and/or a Level 3 (L3) cache 816; a decode unit 820 for decoding the instructions (e.g., decoding program instructions into micro-operations or "uops"); an execution unit 830 for executing the instructions, and a retirement unit 850 for retiring the instructions. These processor units are well understood by those of skill in the art and will not be described here in detail to avoid obscuring the underlying principles of the invention.

Also illustrated in FIG. 8 is an inter-core communication component 818 includes data paths and control logic for enabling communication between the cores. For example, upon determining that an atomic operation should be executed remotely, a first core may use the inter-core communication component 818 to send a remote atomic message packet to a second core so that the second core may perform the atomic operation (as discussed in detail below). In one embodiment, the inter-core communication component 818 is provided within the "uncore" component of the processor 850. In one embodiment, the uncore component also includes cache coherency logic for implementing a memory/cache coherency protocol (e.g., such as MESI, MOSI, or MOESI) to ensure consistency between cache lines stored in the various caches and in system memory. Additionally, the uncore component may couple the cores (and caches) to an interconnect such as a quick path interconnect (QPI).

The instruction fetch unit 810 includes various well known components including a next instruction pointer 803 for storing the address of the next instruction to be fetched from memory 800 (or one of the caches); an instruction translation look-aside buffer (ITLB) for storing a map of recently used virtual-to-physical instruction addresses to improve the speed of address translation; a branch prediction unit 802 for speculatively predicting instruction branch addresses; and branch target buffers (BTBs) 801 for storing branch addresses and target addresses. Once fetched, instructions are then streamed to the remaining stages of the instruction pipeline including the decode unit 830, the execution unit 840, and the retirement unit 850. The structure and function of each of these units is well understood by those of ordinary skill in the art and will not be described here in detail to avoid obscuring the pertinent aspects of the different embodiments of the invention.

As illustrated in FIG. 8, prediction logic 805 may be implemented within the decode 830 and/or execution 840 stages of the pipeline to generate predictions related to atomic operations as described herein. In particular, the prediction logic 805 may estimate the expected cost of a local atomic operation (i.e., executing the atomic operation on the current core) and the expected cost of a remote atomic operation (i.e., the cost of transferring the atomic operation to a different core which will execute the atomic operation). In one embodiment, if the expected cost of the local atomic operation is lower than the expected cost of the remote atomic operation, then the atomic operation is executed locally. Conversely, if the expected cost of the local atomic operation is higher than the expected cost of the remote atomic operation, then the atomic operation is executed remotely.

Figure 9:
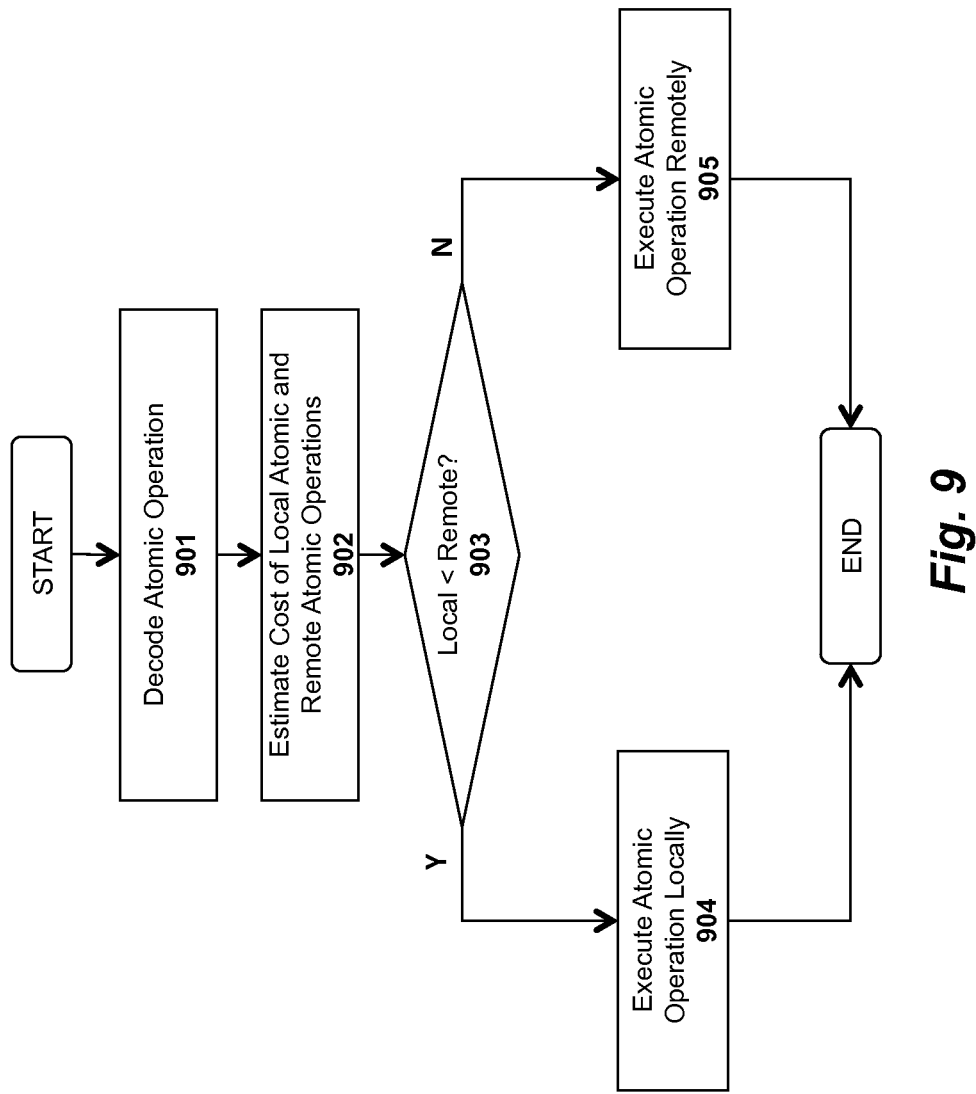
FIG. 9 illustrates a one embodiment of a method for determining whether to execute atomic operations locally or remotely.

A method in accordance with one embodiment of the invention is illustrated in FIG. 9. The method may be executed by the prediction logic 805 within the processor architecture shown in FIG. 8. However, the method shown in FIG. 9 is not limited to any particular architecture.

At 901, an atomic operation is decoded (e.g., by decoder 830) and, at 902, the cost of local and remote atomic operations is calculated. If the cost of the local atomic operation is less than the cost of the remote atomic operation, determined at 903, then the atomic operation is executed locally at 904. If the cost of the local atomic operation is determined to be greater than the cost of a remote atomic operation, then at 905, the atomic operation is executed remotely.

One embodiment of the invention compares the expected costs to predict whether it is beneficial to perform an atomic operation locally or remotely using the following estimates:

Expected Cost of Local Atomic=$p$(local cache hit)*cost_op+(1−$p$(local cache hit))*(cost_op+ cost_miss+expected_contention*cost_ contention)

Expected Cost of Remote Atomic=cost_send_request+$p$(remote cache hit)*cost_op+(1−$p$(remote cache hit))*(cost_op+ cost_miss)+expected_contention*cost_op Where:
$p$(local cache hit)=the probability of a hit in the local cache, when an attempt is made to execute the atomic operation locally $p$(remote cache hit)=the probability of a hit in the remote cache, when an attempt is made to execute the atomic operation remotely cost_op=cost of reading the cache line from the L1 cache, the ALU operation, and the write back to the L1 cache cost_miss=cost of a read for ownership (RFO) on the cache line not found in the local cache (e.g., directory action, transfer between cores)

expected_contention=the expected number of other requests waiting to perform an atomic operation on the same cache line cost_contention=additional time & energy spent waiting for the RFO because another thread has locked the cache line cost_send_request=the energy of sending the remote atomic request (we ignore the time cost since multiple remote atomic requests can be overlapped)

Most of the above terms are static, or can be approximated by constant numbers. Consequently, to simplify the above calculations, one embodiment of the invention generates estimates for: (1) $p$(local cache hit) (the probability of a core hitting in its cache if it performs a local atomic operation); (2) $p$(remote cache hit) (the probability of the remote core hitting in its cache if asked to perform a remote atomic operation), and (3) expected_contention (the expected number of other requests waiting for the same cache line). The cost for a local atomic operation and a remote atomic operation are estimated based on these values and a decision is made as to whether to execute locally or remotely based on the estimated costs.

Figure 10:
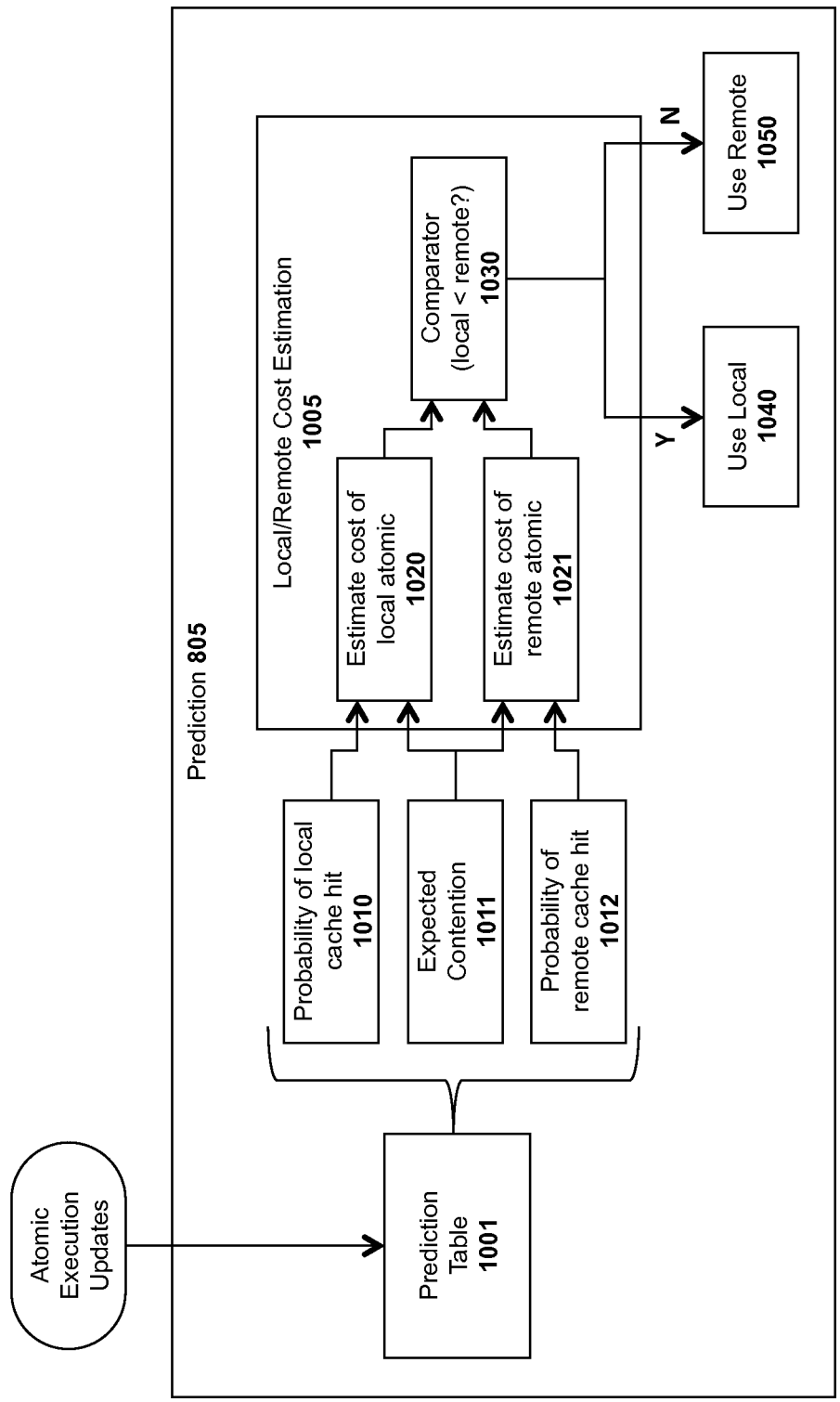
FIG. 10 illustrates prediction logic employed in one embodiment of a system for determining whether to execute atomic operations locally or remotely.

FIG. 10 illustrates additional details for one embodiment of the prediction logic 805 which includes a prediction table 1001 storing historical atomic operation data (i.e., related to prior atomic operations) from which the above values may be determined. Details of one embodiment of the prediction table are described below with respect to FIG. 11. Using the data maintained in the prediction table 1001, the prediction logic 805 determines, for each atomic operation, the probability of a local cache hit 1010, the expected contention 1011, and the probability of a remote cache hit 1012. A local/remote cost estimation module 1005 generate an estimated cost of a local atomic operation 1020 using the probability of a local cache hit and/or the expected contention 1011 and generates an estimated cost of a remote atomic operation 1021 using the expected contention 1011 and/or the probability of a remote cache hit 1012. A comparator module 1030 compares the two results. If the cost associated with local execution is lower than the cost of remote execution, then local execution is selected for the atomic operation (1040). By contrast, it the cost associated with local execution is greater than the cost of remote execution, then remote execution is selected for the atomic operation (1050).

There are several ways to predict the probability of a local cache hit 1010, the expected contention 1011, and the probability of a remote cache hit 1012. However, in one embodiment, simplifying assumptions are made to avoid directly predicting some or all of these quantities (thereby reducing the processing overhead to perform the estimates).

First, considering temporal locality, all three quantities are affected by the amount of re-use of each cache line (i.e., the frequency with which the cache line is re-used by the cores). If there is little or no re-use of a given line, then it will have a small chance of residing in any cache (local or remote), and should see little contention. The cost of an atomic operation will be dominated by accessing the line from farther down in the memory hierarchy, practically rendering remote atomics ineffective. Thus, in one embodiment, an assumption is made that the cache lines see significant re-use.

If a particular cache line is re-used frequently, then when a first core (e.g., core 1) accesses it, it should hit in the cache unless another core has accessed it more recently (e.g., core 2, core N, etc). If all cores save one are using remote atomics for a given address, and the ones using remote atomics all send their requests to the remaining core (another assumption), then the remote core should be the only one accessing it. Consequently, in one embodiment, it is assumed that the probability of a remote cache hit is 1.0 (100%).

In other words, in this embodiment, there is one core, say core X, that is using local atomics, and all other cores are using remote atomics and sending their requests to core X. Consequently, core X should be the only one directly accessing the cache line.

Assuming each core has no more than one outstanding atomic operation for the same cache line (i.e., expected_contention can be no larger than (# hardware threads−1)), the other two quantities are directly dependent on each other. The probability of a local cache hit is inversely proportional to the expected contention. That is, the probability of core 1 hitting in its cache is 1/(1+(expected_contention)). Therefore, one embodiment directly predicts either the local cache hit probability or the expected contention (but not both).

In one embodiment, the prediction logic 805 chooses whether to predict the local cache hit probability or the expected contention based on the instruction pointer (IP) of the atomic operation. In particular, the prediction table 1001 shown in FIG. 11 is indexed using the instruction pointer 1101 for the current atomic operation. Once a particular atomic operation is complete, a new entry for that atomic operation is created (i.e., a new row in the table) or an existing entry having the same instruction pointer is updated to reflect the latest choice 1102 for that atomic operation (i.e., local or remote). If the latest choice was local, then one embodiment of the prediction logic 805 predicts the local cache hit probability by maintaining two additional counters in each table entry: one for the number of times that atomic operation has been executed 1103, and another for the number of local cache hits for that operation 1104. In one embodiment, the counters are periodically right-shifted to divide them by two, to prevent overflow. The ratio of the two counters provides the recent local cache hit rate for that atomic operation, which the prediction logic 805 may use for the prediction. For example, in the example shown in FIG. 11, atomic operation #1 has been executed 4 times with 1 local cache hit and atomic operation #4 has been executed 5 times with 4 local cache hits. Consequently, the local cache hit probability is 0.25 for atomic operation #1 and 0.80 for atomic operation #4. In one embodiment, for remote atomics, the counter for the number of local cache hits 1104 will not increase, while the counter indicating the number of times the operation was executed 1103 will always increase, causing the prediction logic 805 to estimate a relatively low local cache hit probability.

If, on the other hand, the latest choice for a given static atomic operation was remote (as indicated in column 1102 for atomic operations #2 and #3), then in one embodiment, feedback is received from the remote core. In particular, in one embodiment, when a core receives a request to execute a remote atomic operation, it acknowledges the request, and includes as part of the acknowledgement message, the number of requests that were waiting for that cache line when the request arrived. This is used as the amount of contention for this atomic operation 1105. When the requesting core receives the acknowledgement, it stores the contention in the IP-indexed table 1001 as the expected contention prediction (in column 1105). In the example shown in FIG. 11, the expected contention is 3 for atomic operation #2 and 1 for atomic operation #3, indicating that 3 and 1 requests, respectively, were waiting for the cache line when the request arrived. In some embodiments, the table 1001 stores the last few values, as well as their moving average (to smooth out fluctuations), and uses the average as the prediction of expected contention.

In one embodiment, remote atomic execution message packets are transmitted between cores to request remote atomic operations and receive responses. In one embodiment, a message packet containing a remote execution request may contain an operation field to indicate the requested operation to be performed remotely; an address field to indicate the address associated with the source data for the operation; one or more value fields containing values of local data marshaled by the originating core needed for the operation; one or more flag fields containing flag information (e.g., from a control register of the originating core); and a padding field containing pad bits to extend the message to a fixed packet width. A response message from the remote core may contain the expected contention data (mentioned above) and/or results from the execution of the remote atomic operation.

Figure 12:
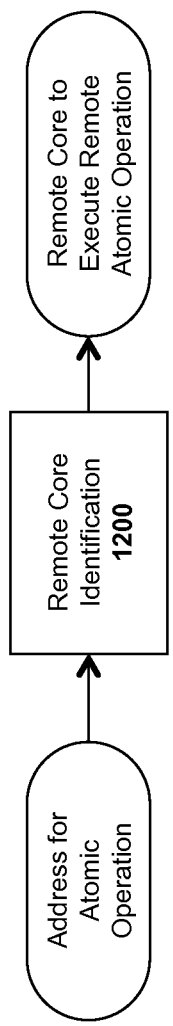
FIG. 12 illustrates remote core identification logic employed in one embodiment of the invention.

In one embodiment, the originating core determines the remote core to perform remote atomics. While there are many possible ways to determine the answer to this question (e.g., prediction tables, software hints, etc), one embodiment of the invention employs one that is a logical extension to the above reasoning. Since these embodiments are concerned with contended atomic operations on lines with significant reuse, it does not matter which core performs the atomic operations on a given cache line, only that the same core perform the operations for all other cores. Consequently, an address hashing function is employed in one embodiment, to choose the core. FIG. 12 illustrates remote core identification logic 1200 which reads the address associated with the remote atomic operation (e.g., the instruction pointer for the current atomic operation) and implements a hashing function to identify the core responsible for that remote atomic operation (if one exists). The remote core identification logic 1200 may be implemented as part of the prediction logic 805 described above, or may be implemented as a separate logical unit (e.g., within the execution or decode stages). In one embodiment, rather than hashing the address, a portion of the address for the atomic operation may be used to identify the remote core (e.g., the least significant bits of the address).

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals— such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
    a local core comprising:
        a decoder to decode an atomic operation;
        prediction logic to estimate a cost associated with execution of the atomic operation on the local core and a cost associated with execution of the atomic operation on a remote core; and
    a remote core to execute the atomic operation if the prediction logic determines that the cost for execution on the local core is relatively greater than the cost for execution on the remote core; and
    the local core to execute the atomic operation locally if the prediction logic determines that the cost for local execution on the local core is relatively less than the cost for execution on the remote core.

2. The processor as in claim 1 wherein the cost associated with execution of the atomic operation on the local core comprises determining a probability of a local cache hit for a cache line associated with the atomic operation and/or expected contention for the cache line.

3. The processor as in claim 2 wherein the cost associated with execution of the atomic operation on the remote core comprises determining a probability of a remote cache hit for a cache line associated with the atomic operation and/or expected contention for the cache line.

4. The processor as in claim 3 further comprising:
    a prediction table within each core storing an entry for each of a plurality of atomic operations, wherein the table stores a number of times each atomic operation has been executed and a number of local cache hits, wherein the prediction logic is to determine probability of a local cache hit for each atomic operation using a ratio comprising a number of local cache hits over a number of times each atomic operation has been executed.

5. The processor as in claim 4 wherein the table is indexed by an instruction pointer address associated with each atomic operation.

6. The processor as in claim 3 wherein, if a most recent atomic operation was executed locally, then the prediction logic predicts probability of a local cache hit to determine costs but not expected contention.

7. The processor as in claim 3 wherein, if a most recent atomic operation was executed remotely, then the prediction logic predicts expected contention to determine costs but not probability of a local cache hit.

8. The processor as in claim 3 wherein to determine cost of a remote atomic operation, the prediction logic additionally determines an expected cost to send a request to the remote core to execute the atomic operation.

9. The processor as in claim 1 further comprising:
    remote core identification logic to determine an identify of a remote core to perform the atomic operation using at least a portion of an instruction pointer address associated with the atomic operation.

10. The processor as in claim 9 wherein the remote core identification logic is to perform a hash operation using the at least a portion of the instruction pointer address associated with the atomic operation to generate the identity of the remote core.

11. A method comprising:
    decoding an atomic operation;
    estimating a cost associated with execution of the atomic operation on the local core and a cost associated with execution of the atomic operation on a remote core; and
    executing the atomic operation on a remote core if the estimated cost for execution on the local core is relatively greater than the estimated cost for execution on the remote core; and
    executing the atomic operation on a local core if the estimated cost for execution on the local core is relatively less than the estimated cost for execution on the remote core.

12. The method as in claim 11 wherein the estimated cost associated with execution of the atomic operation on the local core comprises determining a probability of a local cache hit for a cache line associated with the atomic operation and/or expected contention for the cache line.

13. The method as in claim 12 wherein the estimated cost associated with execution of the atomic operation on the remote core comprises determining a probability of a remote cache hit for a cache line associated with the atomic operation and/or expected contention for the cache line.

14. The method as in claim 13 further comprising:
    storing an entry in a table for each of a plurality of atomic operations, wherein the table stores a number of times each atomic operation has been executed and a number of local cache hits, the probability of a local cache hit is determined for each atomic operation using a ratio comprising a number of local cache hits over a number of times each atomic operation has been executed.

15. The method as in claim 14 wherein the table is indexed by an instruction pointer address associated with each atomic operation.

16. The method as in claim 13 wherein, if a most recent atomic operation was executed locally, then predicting probability of a local cache hit to determine costs but not expected contention.

17. The method as in claim 13 wherein, if a most recent atomic operation was executed remotely, then predicting expected contention to determine costs but not probability of a local cache hit.

18. The method as in claim 13 wherein to determine cost of a remote atomic operation, an expected cost to send a request to the remote core to execute the atomic operation is determined.

19. The method as in claim 11 further comprising:
determining an identify of a remote core to perform the atomic operation using at least a portion of an instruction pointer address associated with the atomic operation.

20. The method as in claim 19 wherein identifying a remote core further comprises performing a hash operation using the at least a portion of the instruction pointer address associated with the atomic operation to generate the identity of the remote core.

21. A system comprising a memory for storing instructions and data;
a graphics processor for performing graphics operations in response to certain instructions, a network interface for receiving and transmitting data over a network; and
a processor comprising:
a local core comprising:
a decoder to decode an atomic operation;
prediction logic to estimate a cost associated with execution of the atomic operation on the local core and a cost associated with execution of the atomic operation on a remote core; and
a remote core to execute the atomic operation if the prediction logic determines that the cost for execution on the local core is relatively greater than the cost for execution on the remote core; and the local core to execute the atomic operation locally if the prediction logic determines that the cost for local execution on the local core is relatively less than the cost for execution on the remote core.

* * * * *